United States Patent

Stevens

Patent Number: 5,892,605
Date of Patent: Apr. 6, 1999

[54] OPTICAL CROSSBAR USING GUIDED SPATIAL DIVISION MULTIPLEXING

[75] Inventor: Rick Clevie Stevens, Apple Valley, Minn.

[73] Assignee: Lockheed Martin Corporation, Bethesda, Md.

[21] Appl. No.: 829,396

[22] Filed: Mar. 31, 1997

[51] Int. Cl.$^6$ ............................ H04B 10/12; H04B 10/00
[52] U.S. Cl. ............................................ 359/173; 359/163
[58] Field of Search ...................................... 359/117, 154, 359/157, 163–164, 172–173; 385/17

[56] References Cited

U.S. PATENT DOCUMENTS

| | | | |
|---|---|---|---|
| 5,400,162 | 3/1995 | Newberg et al. | 359/117 |
| 5,557,693 | 9/1996 | Stevens et al. | 385/24 |
| 5,592,321 | 1/1997 | Elberbaum | 359/173 |

*Primary Examiner*—Kinfe-Michael Negash
*Attorney, Agent, or Firm*—Glenn W. Bowen

[57] ABSTRACT

Optical transmission is accomplished with a set of transmitter arrays that are each constructed to transmit spatially separated optical data streams that are determined by the positions of each transmitter of said transmitter array and a set of receiver arrays, each of which is constructed to receive one or more of the spatially separated optical data streams. Optical coupling is provided over transmitter and receiver fiber-optic cables and other conventional optical elements, such as lens and prisms, to provide optical paths that maintain the spatial separation of said optical data streams as established by said transmitters. An interface is coupled to transmitters and to receivers which are constructed (i) to translate electrical data signals into optical data streams which are intended to be transmitted from the transmitters to selected receivers and which contain receiver selection data that specifies the selected receivers, and (ii) to prevent any of the transmitters from transmitting to any particular receiver that is selected by a particular transmitter to receive data while that particular receiver is still receiving an optical data stream from another of the transmitters that previously selected that particular receiver. The optical transmitters are implemented with vertical cavity surface emitting lasers (VCSEL) 2-dimensional arrays consisting of an N×N matrix of 30 microns diameter optical emitters with the optical transmitters consisting of a complementary N×N 2-dimensional photodiode array. The photodiode array would use 80 micron diameter oversized detectors to minimize tolerance requirements.

7 Claims, 3 Drawing Sheets

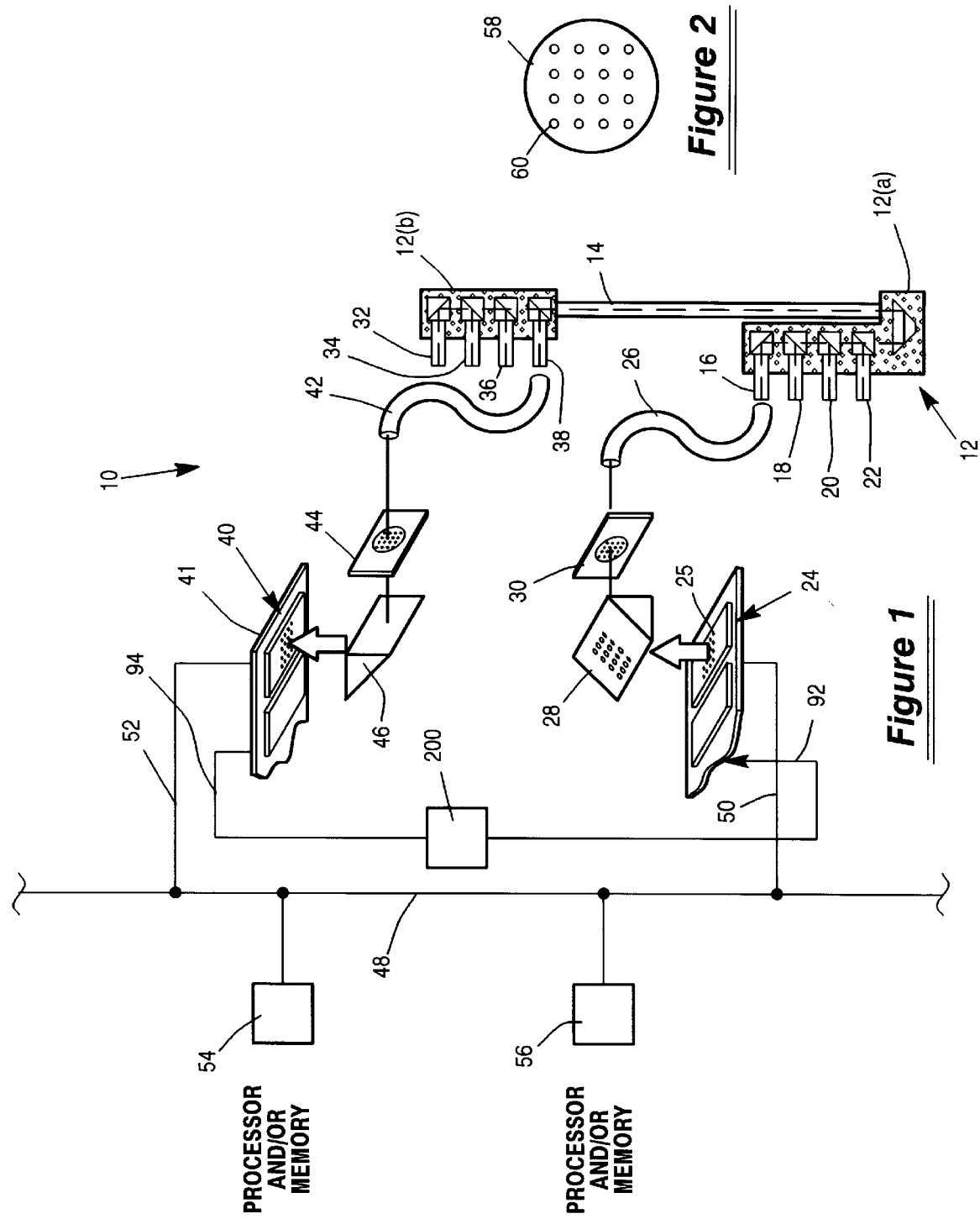

OPTICAL CROSSBAR USING GUIDED SPATIAL DIVISION MULTIPLEXING

BACKGROUND OF THE INVENTION

1. Field of the Invention

A high bandwidth optical crossbar switch is created using spatial multiplexing in which multiple distinct optical paths are provided in high density coherent fiber-optic transmitting and receiving bundles.

2. Background Description

U.S. Pat. No. 5,557,693 in the name of the inventor of this application, which issued Sep. 17, 1996 and is entitled "Apparatus and Method for Transmitting Optical Data," shows a method and apparatus for transmission of a multiplicity of independent optical data signals. This patent eliminates the need to precisely align each source of an optical data signal with a single fiber-optic strand. This is accomplished by including an emitter array for emitting a multiplicity of the optical data signals onto one end-face of a coherent fiber-optic bundle and a photodiode array with a receiving area that is larger than the output area of a plurality of fiber-optic strands wherein each group of strands carries particular data signal.

U.S. Pat. No. 5,592,321 entitled "Apparatus for Selective Routing of Information Signals" issued Jan. 7, 1997 in the name of David Elberbaum. The patent discloses an apparatus for the selective routing of information signals in which a plurality of fiber-optic lines are provided for carrying the light signals from transmitting units. Each fiber-optic line corresponds to one of the transmitting units, and at least one receiving unit is provided for selectively receiving the information carried by the fiber-optic lines. The receiving unit includes a liquid crystal panel that has a plurality of light passing areas in which the optical transmission properties of the light passing areas are controlled individually. Connections may be made between the transmission units and the receiving unit by the fiber-optic lines in any arbitrary combination. Each light passing area corresponds to one of the fiber-optic lines. A receiver which is part of the receiving unit generates an electrical signal converted from the light which passes through the liquid crystal panel.

SUMMARY OF THE INVENTION

An optical data transmitting and receiving apparatus is provided in which one or more transmitter arrays are constructed to transmit spatially separated optical data streams that are determined by the positions of each transmitter of said transmitter array. One or more receiver arrays are included in which each receiver is constructed to receive one of said spatially separated optical data streams over an optical coupling structure constructed to provide optical paths that maintain the spatial separation of said optical data streams as established by said transmitters.

A controller coupled to the transmitters and receivers is constructed (i) to translate electrical data signals into optical data streams which are intended to be transmitted from the transmitters to selected receivers and which contain receiver selection data that specifies the selected receivers, and (ii) to prevent any of the transmitters from transmitting to any particular receiver that is selected by a particular transmitter to receive data while that particular receiver is still receiving an optical data stream from another of the transmitters that previously selected that particular receiver.

BRIEF DESCRIPTION OF THE DRAWINGS

FIG. 1 is a schematic drawing that shows an embodiment of an optical crossbar system of the present invention;

FIG. 2 is a cross-sectional view of a fiber-optic cable bundle utilized in the embodiment of FIG. 1;

DESCRIPTION OF THE PREFERRED EMBODIMENT

Figure 3:
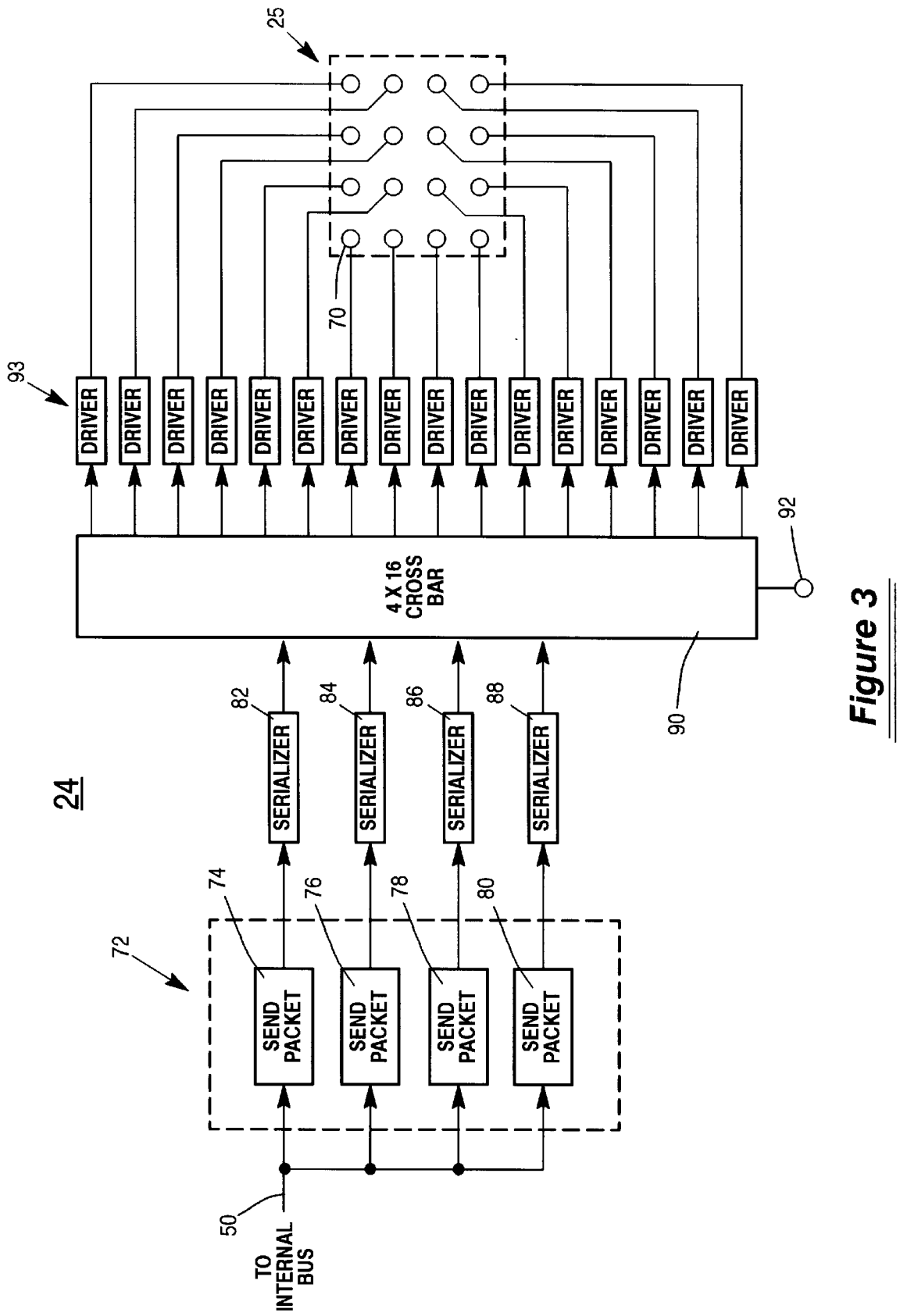
FIG. 3 is a block diagram of a transmitter node of the system of FIG. 1.

FIG. 1 illustrates an embodiment of the present invention which provides for a high bandwidth optical crossbar switch that uses guided spatial division multiplexing. A number of optical transceivers, each having a transmit logic section and a receive logic section, can be coupled together over multiple distinct optical paths. Each of these paths may be transmitted concurrently over a high density coherent fiber-optic bundle. Spatial distinctness of each signal path enables crossbar topology connectivity. A coherent coupler is used to control the spatial location of individual data transmissions in transmitting and receiving fiber-optic cables in a manner which enables individual transmitters to identify unused locations within the fiber-optic bundles at which they may transmit data signals without conflict with other signals.

In general, optical crossbar interconnect technology scales from smaller to larger size systems more effectively and is more affordable than an electrical implementation. Crossbar interconnecting networks are attractive for multiprocessing because of their linear bisection bandwidth growth and a constant low latency since each node is only one switch away from every other node. The cost of an electrical crossbar switch structure scales as a function of $N^2$, where N is the number of nodes, so the crossbar has historically been applied to only relatively smaller systems. However, with the use of the guided spatial division multiplexing crossbar technique of the present invention, cost effective growth of crossbar technologies may be used to provide superior scaleable multi processor performance.

In the embodiment shown in FIG. 1, there is an optical coupling system 10 which has a coherent optical coupler 12 that is capable of controlling data transmissions from a plurality of transmitters to a plurality of receivers. The transmitters and receivers may be located at the same physical side of the coupler as shown in FIG. 1, or they may be located on opposite sides of the coupler. Aside from the manner in which the light is directed from the transmitters to the receivers, the basic principles are applicable to both embodiments, as well as other varied embodiments that will be apparent to those skilled in the art.

In the embodiment of FIG. 1, the optical coupler 12 is separated into a transmission section 12(a) and a receiving section 12(b). These may be integrated into the same physical structure, or they be interconnected by a light pipe 14 or a coherent fiber-optic bundle, as shown in FIG. 1, so that transmitted data signals are coupled from the transmission section 12a to the receiving section 12b.

A number of transmitters and receivers may be used to implement the invention. In the embodiment of the drawings, only one transmitter 24 and one receiver 40 are utilized to simplify the drawing, but input and output ports are provided on the optical coupler sections 12(a) and 12(b), respectively, to support three other transmitter and receiver arrays. An array of lasers 25 of the transmitter 24 are intended to be optically coupled to the input pipe 16 of the coupler 12. Each of the other input pipes 18, 20, 22 may be coupled to a separate transmitter array (not shown). The array 25 may be formed of vertical cavity, surface emitting lasers (VCSEL), and the light signals from the array 25 in the illustrated embodiment are coupled into a fiber-optic cable 26. The fiber-optic cable 26 in turn couples these signals to the input optical pipe 16. Light signals from the array 25 may be transmitted to the cable 26 in various ways, such as through a prism 28 and into a relay lens 30, or by other known means.

The coherent optical coupler receiver section 12(b) has a number of optical output pipes 32, 34, 36 and 38. Again, only one receiver 40 is shown for the purpose of clarity. The receiver 40 may consist of a 2D array of photodiodes 41, or other optical receiving devices, that are coupled to receive the light signals that are passed through the optical cable 42. In this manner each of the lasers of the optical lasers of the array 25 may be coupled to one of the photodiodes of the array 41 or to photodiodes of the other receivers that have not been illustrated. Again, the light signals may be passed through a lens 44 and into a prism 46, or by other optical coupling means to direct the light onto photodiodes of the optical receiver array 41.

As previously noted, the transmitters and the receivers of the system may be located adjacent to each other on the same side of the optical coupler, in which case they may be coupled to the same bus. On the other hand, if the transmitters and receivers may be located at separate locations on opposite sides of the optical coupler two separate buses may be utilized. In the illustrated embodiment, the transmitter is connected over a group of lines (indicated by the single line 50 in the drawing) to the bus 48, and the receiver is connected to the bus over a group of lines indicated by a single line 52 in the drawings. One or more processor (54) and/or memory (56) resources are coupled to the bus to provide storage for transmitted and received information. A control interface 200 is connected between the transmitter 24 and the receiver 40. This is used to inform the transmitter which optical parts are being used.

FIG. 2 illustrates a cross-sectional view that is representative of the transmitter and receiver fiber-optic bundles, such as bundles 26 and 42. Each of the dots 60 represent the position of one of the output light paths from either the transmitter into the cable or from the cable out to the receiver, as appropriate to the cable type. The control interface 200 controls the transmitters and receivers at each of the nodes so that each transmitter may select any of the lasers of its array that are not transmitting at the time of selection. The identity of the target receiver is provided in the optical information bits that are transmitted by the lasers. Any of the transmitters of the system may transmit to any of the receivers of the system.

Figure 4:
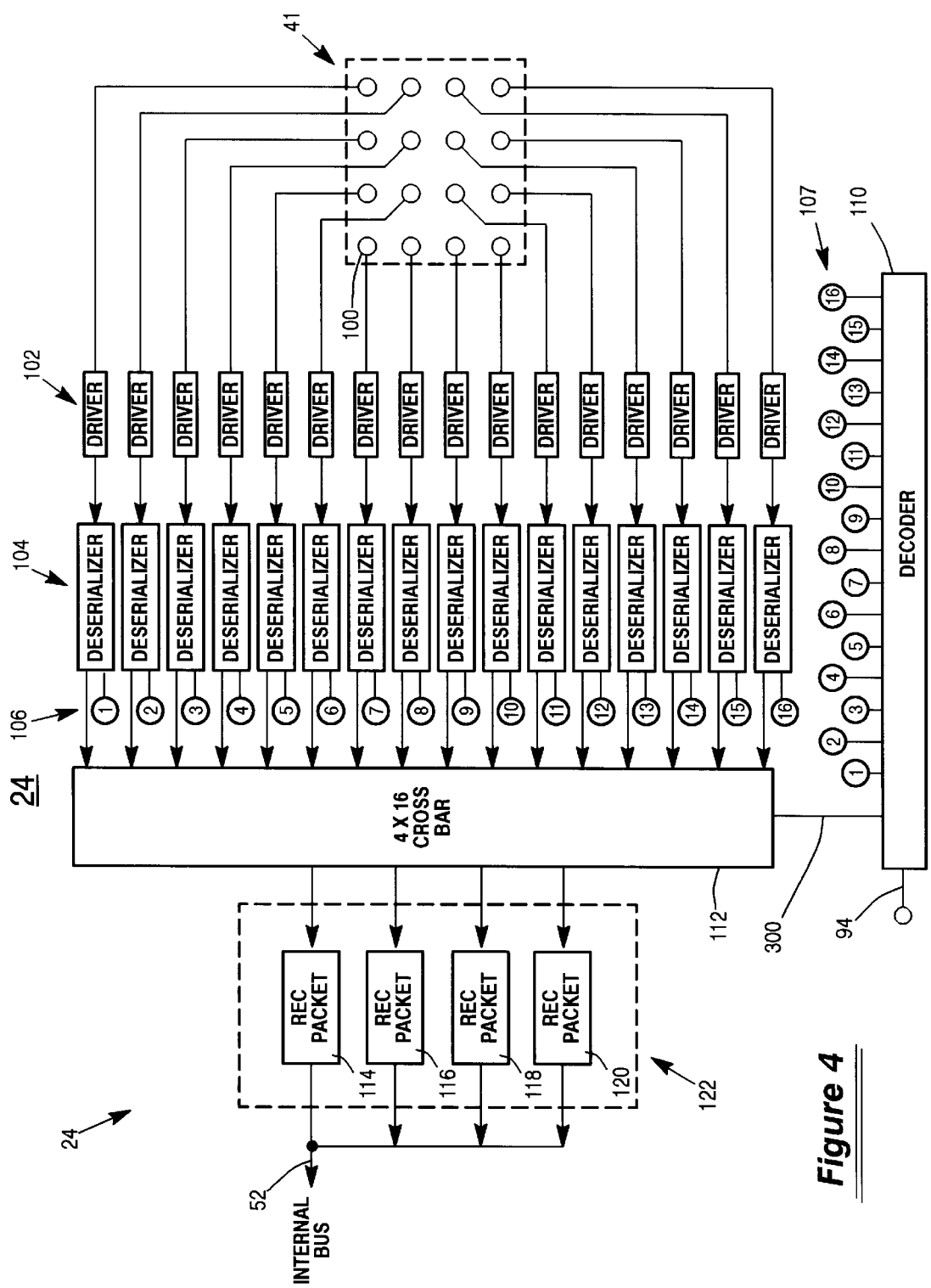
FIG. 4 is a block diagram of a receiver node of the system of FIG. 1.

FIGS. 3 and 4 are block diagrams of one transmitter and one receiver element of the illustrated embodiment that show in more detail how spatially distinct packets of information may be transmitted from a particular laser, such as 70 (FIG. 3) to a corresponding photodiode 100 (FIG. 4). The identification of the receiver that is intended to receive the transmitted data is accomplished by means of a header signal in the packet. The transmission of the packet from the transmitter array 24 to the receiver array 40 occurs when no other transmitter is transmitting information into the same position of a transmitter fiber-optic cable (FIG. 2). In FIG. 3 the 2D array 25 of vertical cavity surface-emitting lasers (VCSEL) is illustrated as consisting of 4×4 laser cells in accordance with the pattern represented in the fiber-optic cable of FIG. 2. The number and the positioning of the lasers of the array are variable and may be tailored to the specific application. The optical data signals to be transmitted are translated from electrical data signals that are coupled over the bus 50 to the transmitter 24. Data packets are stored in a send buffer section 72 in the transmitter unit which in the described embodiment has four buffer sections 74, 76, 78 and 80, each of which provides packets of data bits for transmission.

Data in the send packet buffers 74–80 are serialized into packets by the serializers 82, 84, 86 and 88. The packets are then coupled to the four by sixteen crossbar switch 90. The crossbar switch 90 allows a particular laser, such as the laser 70 which is associated with dot position 60 of a cable 26, to be activated to transmit data. The interface 200 supplies a signal to the output select line 92 of the crossbar switch 90 which selects a deactivated laser when no other signals are being sent over dot position 60. The control interface determines when transmission may occur through monitoring of the receiver section of the system, as is described subsequently. Output of the crossbar switch 90 is provided through the drivers 93 which are each connected to an individual one of the lasers, such as laser 70. This allows 16 optical data packets to be capable of simultaneously supplying packets to selected lasers from the send packet buffers 74–80. This embodiment is limited to four distinct packets since there are only four send packet buffers available. However, there is no inherent limitation on the number of send packet buffers that could be implemented.

FIG. 4 shows a schematic of the receiver 40 of the embodiment of FIG. 1. The receiver 40 has an array 41 of photodiode detectors which are arranged to receive the packets that have been transmitted from the output section 12(b) to the input section 12(a) of the optical coupler 12. In the illustrated embodiment, the receiving array 41 consists of 16 photodiode cells that are arranged into an array that is aligned to receive data signals from the lasers of the transmitter array of the system. All of the receivers in the array will receive individual transmitted packets from the optical coupler 12. Received packets are detected at the spatial dot position of a photodiode that is aligned with a specified dot position of the receiving fiber-optic cable. For example, photodiode 100, like the laser 70, is associated with dot position 60 of FIG. 2.

The outputs of the photodiodes are provided to separate receiver amplifiers 102 each of which is coupled to a separate one of the de-serializers 104. The de-serializers have decode terminals 106 which are coupled to the decoders 110. The decoded header associated with an incoming packet in a particular de-serializer is sent to the decoder 110. The decoder 110 determines whether a packet should be received based on a review of the header information. The receiver signals from the terminals 106 connected via terminals 107 and decoder 110 enable a receiver selection signal to be sent on the control line 300 to the crossbar switch 112 to enable the reception of a packet by enabling a path through the switch. The decoder supplies a signal on the line 94 to the line 92 of the transmitter, via the control interface 200, to indicate photodiode positions that are not currently receiving data so that a transmitter may utilize the associated dot position in the transmitter cable to transmit data to the appropriate receiver cable. When a particular de-serializer has been selected to transmitted data to a selected receiver, such as receiver 40, the signal will be switched through the crossbar switch 112. The received data packets can then be re-assembled in the buffer 122 and stored in the receive packet buffers 114, 116, 118 and 120. The receive packet buffers are supplied to the bus 48 and subsequently to processors 54 and memories 56 over the lines 52.

What is claimed is:

1. An optical data transmitting and receiving apparatus comprising:

(a) one or more transmitter arrays in which the transmitters of each array are aligned in a two-dimensional pattern and each transmitter is capable of transmitting a spatially separated optical data stream that is determined by the position of said transmitter;

(b) one or more receiver arrays in which the receivers of each array are aligned in a two-dimensional pattern and each receiver is capable of receiving one of said spatially separated optical data streams at a given time;

(c) an optical coupling structure coupled between said transmitter arrays and said receiver arrays constructed to maintain the spatial separation of said optical data streams established by said transmitters;

(d) a separate transmitter fiber-optic cable coupled between each transmitter array and said optical coupling structure, and a separate receiver fiber-optic cable coupled between each receiver array and said optical coupling structure; and (e) a controller coupled to said transmitters and to said receivers which is constructed (i) to translate electrical data signals into optical data streams which are transmitted from said transmitters to selected receivers and which contain receiver selection data that specifies said selected receivers, and (ii) to prevent any of said transmitters from transmitting to any particular one of said receivers that is selected by a particular one of said transmitters to receive data while that particular one of said receivers is still receiving an optical data stream from another of said transmitters that previously selected said particular receiver.

2. An optical data transmitting and receiving apparatus as set forth in claim 1 wherein said transmitter arrays each comprise a two-dimensional array of vertical cavity surface emitting lasers.

3. An optical data transmitting and receiving apparatus as set forth in claim 1 wherein said receiver arrays each comprise a two-dimensional array of photodiodes.

4. An optical data transmitting and receiving apparatus as set forth in claim 1 wherein said controller comprises an electrical transmit crossbar switch for each transmitter array, which comprises a number of electrical transmit outputs equal to the number of said transmitters of said transmitter array, and a separate electrical signal transmit serializer coupled to each of said transmit outputs, and a receiver crossbar switch for each receiver array which comprises a number of electrical receive inputs equal in number to the number of said receivers of said receiver array and a separate electrical signal receive deserializer coupled to each of said receive inputs.

5. An optical transmitting and receiving coupling structure comprising:

(a) one or more transmitter arrays in which the transmitters of each array are aligned in a two-dimensional pattern and each transmitter is capable of transmitting a spatially separated optical data stream that is determined by the position of said transmitter;

(b) one or more receiver arrays in which the receivers of each array are aligned in a two-dimensional pattern and each receiver is capable of receiving one of said spatially separated optical data streams at a given time;

(c) an optical coupling structure coupled between said transmitter arrays and said receiver arrays constructed to maintain the spatial separation of said optical data streams established by said transmitters;

(d) a separate transmitter fiber-optic cable coupled between each transmitter array and said optical coupling structure, and a separate receiver fiber-optic cable coupled between each receiver array and said optical coupling structure; and (e) a controller coupled to said transmitters and to said receivers which is constructed (i) to translate electrical data signals into optical data streams which are transmitted from said transmitters to selected receivers and which contain receiver selection data that specifies said selected receivers, and (ii) to prevent any of said transmitters from transmitting to any particular one of said receivers that is selected by a particular one of said transmitters to receive data while that particular one of said receivers is still receiving an optical data stream from another of said transmitters that previously selected said particular receiver.

6. An optical data transmitting and receiving apparatus as set forth in claim 5 wherein said transmitter arrays each comprise a two-dimensional array of vertical cavity surface emitting lasers.

7. An optical data transmitting and receiving apparatus as set forth in claim 5 wherein said receiver arrays each comprise a two-dimensional array of photodiodes.

* * * * *